United States Patent

[11] 3,598,148

[72] Inventor Kenneth K. Kroffke
 Cleveland, Ohio
[21] Appl. No. 850,207
[22] Filed Aug. 14, 1969
[45] Patented Aug. 10, 1971
[73] Assignee Airmatic Valve Inc.

[54] MOMENTARY CONTACT POPPET VALVE
 7 Claims, 5 Drawing Figs.
[52] U.S. Cl. .................................................. 137/596.16,
 251/30
[51] Int. Cl. .................................................. F15b 21/08
[50] Field of Search ........................................ 137/596.16,
 596.15, 625.6, 625.63, 625.64; 251/30

[56] References Cited
 UNITED STATES PATENTS
2,880,708 4/1959 Hayner .................... 137/596.15
3,269,417 8/1966 Lansky et al. .............. 137/629.64
3,316,930 5/1967 Gardner .................... 137/270

Primary Examiner—M. Cary Nelson
Assistant Examiner—Robert J. Miller
Attorney—Holgren, Wegner, Allen, Stellman & McCord ABSTRACT: A poppet valve having a poppet assembly mounted for reciprocation to two positions in the valve body. A first position opening one poppet to establish fluid pressure flow from a valve inlet to a valve outlet. A second position closing said one poppet and opening another poppet to establish flow from a valve inlet to a valve outlet. A first solenoid-operated pilot valve momentarily operated to move the poppet assembly from said first position to said second position. A second solenoid-operated pilot valve momentarily operated to restore said assembly to said first position whereby fluid pressure flow is maintained from an inlet to an outlet without the maintenance of current flow in either solenoid.

PATENTED AUG 10 1971

INVENTOR
KENNETH K. KROFFKE
BY
MCNENNY, FARRINGTON,
PEARNE & GORDON
Donald W. Farrington
ATTORNEYS

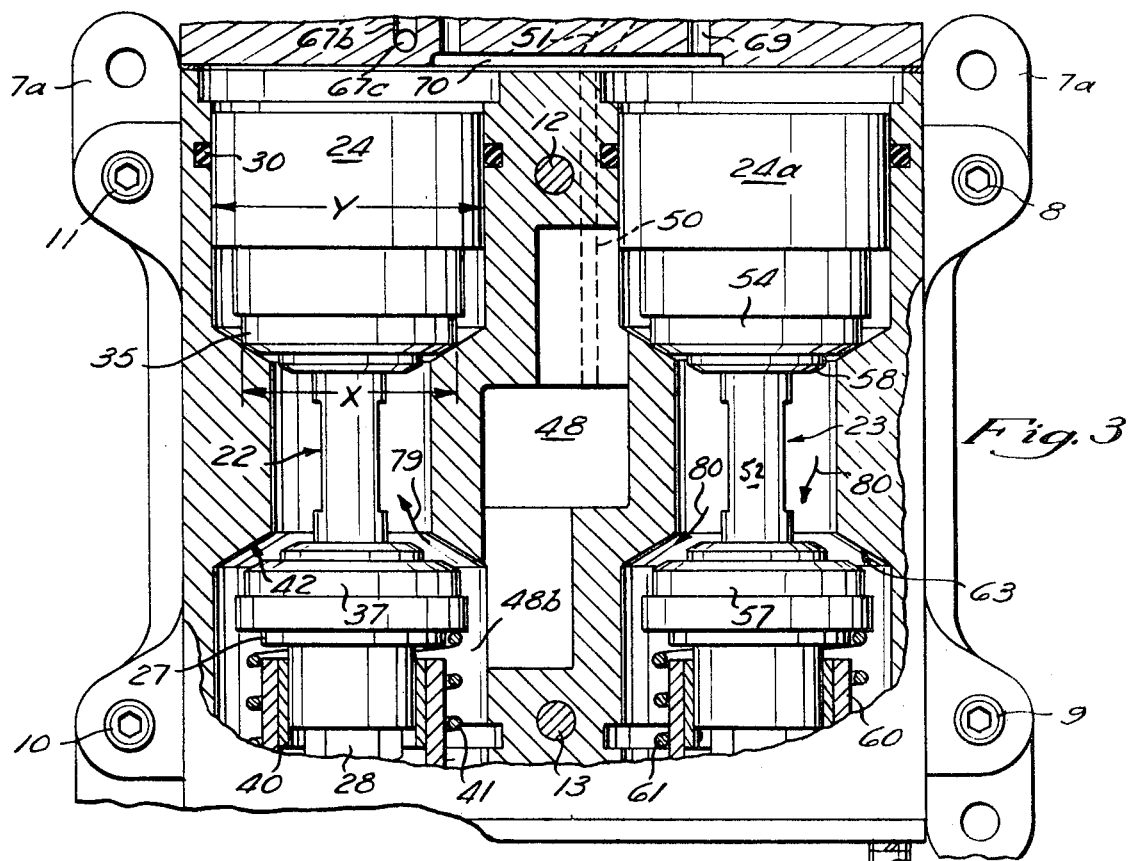
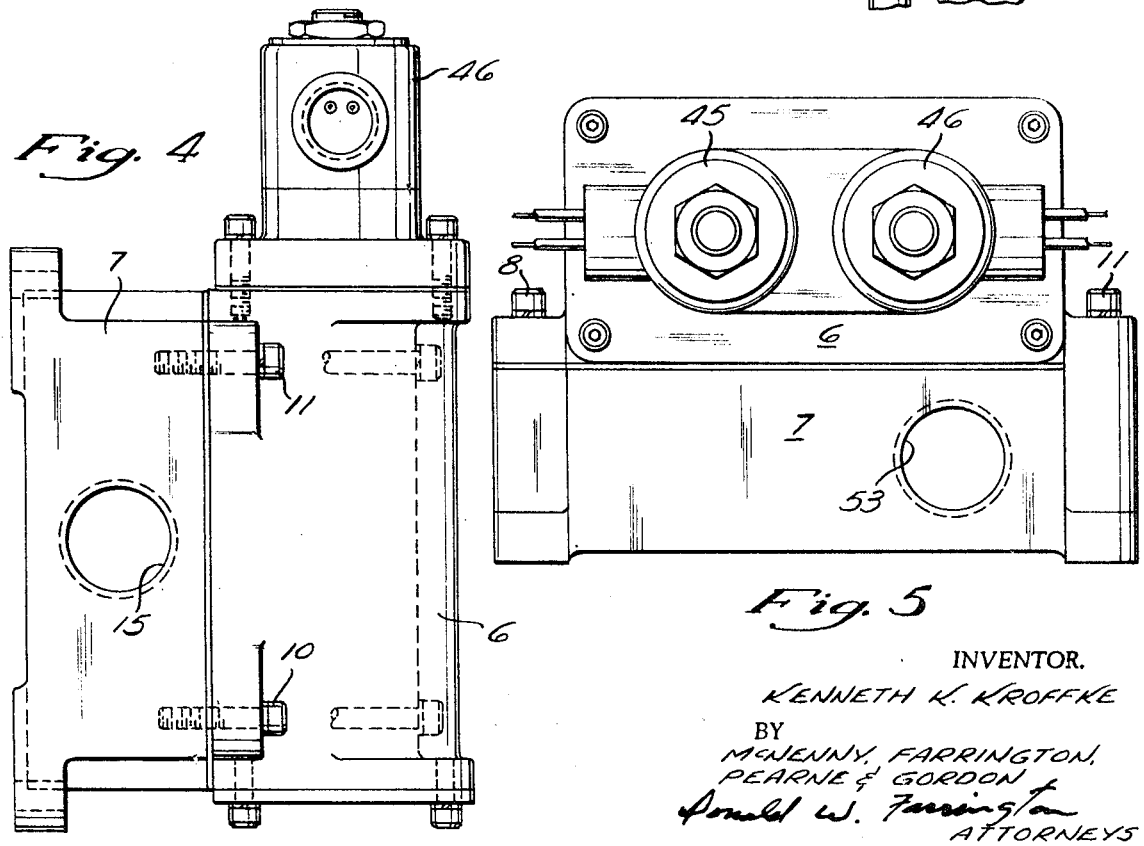

3,598,148

MOMENTARY CONTACT POPPET VALVE

BACKGROUND OF THE INVENTION

Many advantages inherent in poppet valves for handling fluid pressure, such as air, are known. Poppet valves go from zero flow to full flow quickly and the opening and closing of the poppets minimizes the tendency of foreign particles carried by the air to be trapped in the valve. Numerous attempts have been made to provide solenoid-pilot-operated poppet valves which would not require current flow in the solenoid coils to hold the pilot valve open or closed during the time the poppet valves are in their operative position. Such coils heat up while energized and consequently much development effort has been directed to reducing the "on" time of the solenoid. Poppet valves have been combined with pilot operation using shuttle valves, and the like, but this introduces an extra valve assembly and an added item of cost consideration. Such arrangements are also adversely effected by the force of gravity and may be mounted so that the valve drifts or floats to "on" and "off" positions in response to vibration. Reference is made to U.S. Pat. No. 3,316,930 to L. H. Gardner, issued May 2, 1967, as describing and claiming a valve structure having solenoid pilot operation for controlling poppet valves.

SUMMARY

The valve according to the present invention provides an arrangement wherein a pair of poppet valve assemblies are arranged in side-by-side relation. Each assembly includes a stem having a poppet fixed at each end of the stem so that the poppets are moved in unison to engage valve seats within the valve body. Two solenoid pilot valves are provided which are operated electrically in a momentary manner. The terms "momentary" and "bumping" are used in the instant description to characterize quick pressure and release on a switch. With the valve of the instant application all of the poppets are moved to one position by bumping one solenoid switch and are all moved to another position by bumping the other solenoid switch. The solenoid actuation is sequential. The actuation of the first solenoid effects a "make ready" for the other solenoid. Accordingly there is no current flow through either solenoid during the time the poppets are stationary.

BRIEF DESCRIPTION OF THE DRAWINGS

FIG. 3 is an elevation with parts in section showing the poppet assemblies as moved in response to momentary energization of a solenoid-operated pilot valve;

FIG. 4 is an elevation showing the entire valve as viewed from one side thereof; and FIG. 5 is an elevation of the entire valve as viewed from the solenoid end of the valve.

The valve includes a valve body 6 mounted on a base 7. In FIGS. 1, 4 and 5 the valve is illustrated as being mounted on a vertical wall. It will be understood as the description proceeds that this vertical position is referred to for clarity in description and that the valve in its entirety may be mounted and satisfactorily operated at any attitude. The base portion 7 of the valve is shown in its entirety in FIG. 2. The valve body 6 is secured to the base 7 by Allen head capscrews 8, 9, 10, 11, 12 and 13. The ears, such as 7a, at each corner of the base are utilized for mounting the valve on a wall, or the like. All of the pipe connections are formed in the base 7 of the valve.

Figure 1:
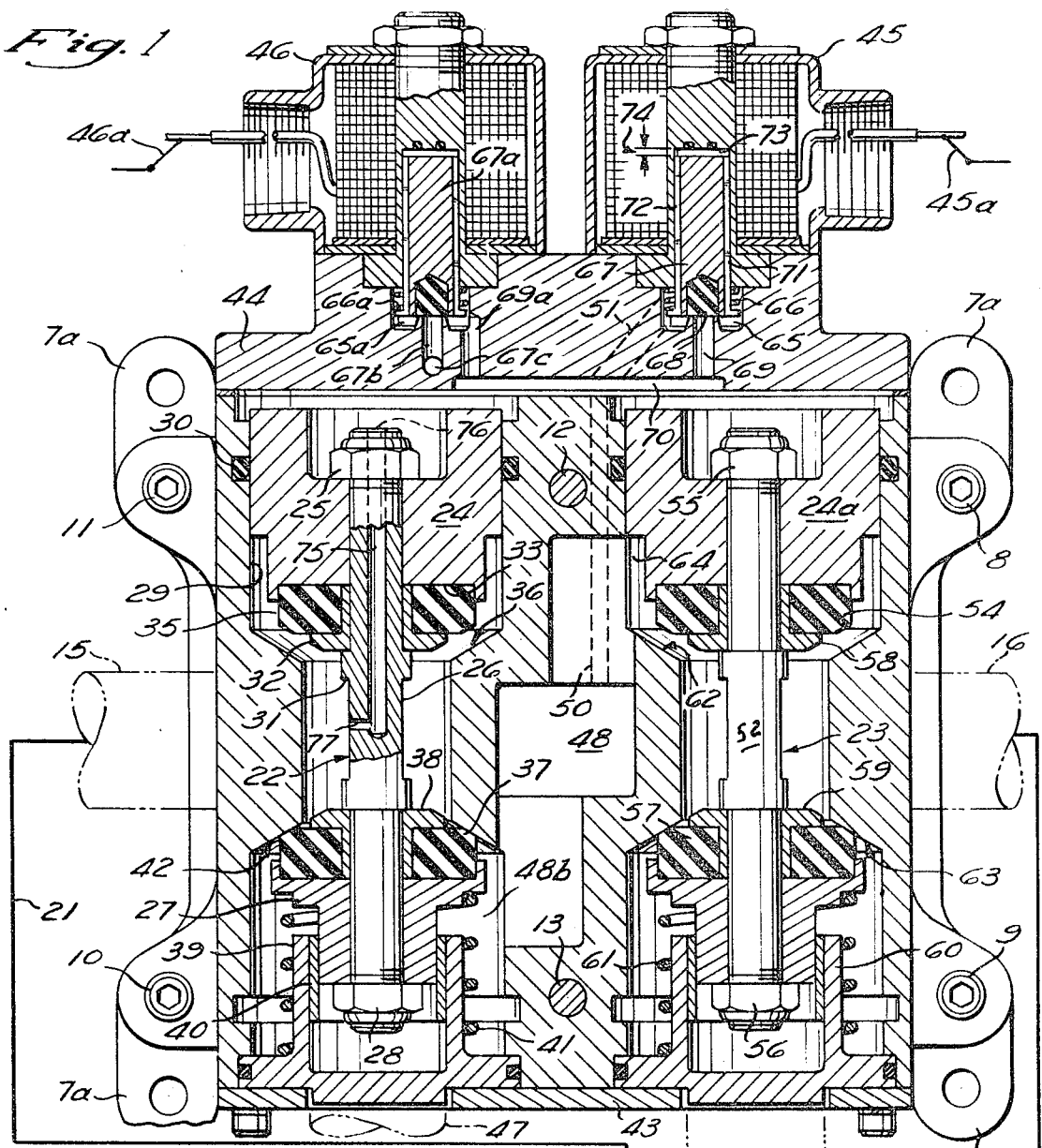
FIG. 1 is an elevation with parts in section of the preferred embodiment of the valve as coupled to a work cylinder.

The valve assembly includes work port 15 at the left-hand side and work port 16 at the right-hand side. A work cylinder 17 is provided with a piston 18 and a piston rod 19. The right-hand work port 16 on the valve is connected by pipe 20 to the right-hand end of the work cylinder. Similarly the pipe 21 at the left-hand side connects the work port 15 to the left-hand end of the work cylinder 17. The diagrammatic showing of the work cylinder 17 and pipe connections 20 and 21 illustrates a useful environment for the valve. When air, or other fluid pressure, is introduced to the work cylinder 17 by way of line 20, the piston 18 moves to the left and air is exhausted from the left-hand end of the work cylinder by way of pipeline 21.

The valve body 6 is provided with a left-hand poppet assembly indicated at 22 and a right-hand poppet valve assembly 23 as indicated in FIG. 1. The assembly 22 at the left-hand side includes a piston 24 secured by nut 25 to the upper end of the valve stem 26. The lower end of the valve stem 26 is provided with a guide member 27 secured to the valve stem 26 by hex nut 28. The piston 24 at the top of the left-hand assembly reciprocates within the cylinder 29 and is sealed with respect to the cylinder 29 by O-ring 30 mounted in the wall of the cylinder 29.

A shoulder 31 formed on the valve stem 26 supports a flanged metal grommet 32 and such grommet 32 cooperating with a recess 33 at the underside of the piston 24 grips a resilient poppet head 35 arranged to engage the valve seat 36 formed on the interior of the valve body. A lower resilient poppet head 37 is similarly supported by a flanged grommet 38 and the recess on the upper side of the guide member 27. It will be observed that both of the resilient poppet elements or heads 35 and 37 are clamped in the position shown by the hex nuts 25 and 28 threaded onto the ends of the valve stem 26.

A tubular guide sleeve 39 at the bottom of the left-hand poppet assembly is provided with a bushing 40 to guide the valve poppet assembly 22 vertically. A spring 41 arranged on the exterior of the tubular guide 39 normally biases the left-hand valve assembly 22 to its uppermost position as shown in FIG. 1. With the valve poppet assembly 22 in its uppermost position, the lower poppet valve head 37 is moved up against the valve seat 42.

The valve body 6 is provided with a bottom closure plate 43 which is secured to the body 6 by four Allen head capscrews. It will be noted that an opening in the closure plate 43 receives a boss on the guide 39 for the left-hand poppet assembly. The top of the valve body 6 is provided with a cover plate 44 which carries the solenoid pilot valve assembly 45 (at the right hand) and 46 (at the left hand).

Figure 2:
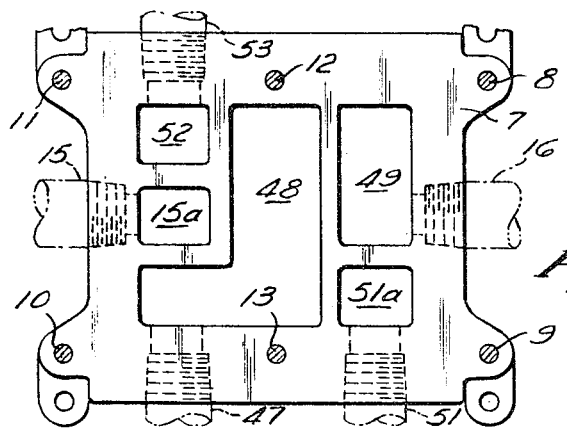
FIG. 2 is a plan view of the base portion of the valve.

The base 7 for the valve is provided with internally threaded apertures to receive the externally threaded pipes for conducting fluid pressure to and from the valve. Referring particularly to FIG. 2, the air supply enters the base 7 by way of pipe 47 leading into a cavity in the base indicated at 48. The left-hand work port 15 is connected with the pipe 21 and the right-hand work port 16 is connected to pipe 20. The left-hand base cavity for work port 15 is indicated at 15a and the right-hand cavity for the right-hand work port 16 is indicated at 49. An exhaust cavity 51a at the lower right portion of the base 7 is connected to the exhaust pipe 51. The valve base 7 is provided with an upper exhaust cavity 52 connected to exhaust pipe 53. The underside of the valve body 6 is provided with openings cooperatively aligned with the openings in the base 7.

In FIG. 1 the air supply cavity 48 opens into the space 48b beneath the poppet 37. A vertically disposed bore 50 opens into the cavity 48 and conducts fluid pressure upwardly therefrom to a bore 51 in the top cover plate 44 so as to lead fluid pressure from the cavity 48 into the solenoid valve assembly 45 at the right-hand side. Both solenoids 45 and 46 are deenergized. Armatures 67 and 67a are held down as shown by springs 66 and 66a, respectively.

There is no fluid pressure in the flat chamber 70 which overhangs the pistons 24 and 24a. The solenoid chamber 65 for the right-hand solenoid is supplied with fluid pressure by way of the bore 50 and 51. There is no fluid pressure in the left-hand solenoid chamber 65a. The bore 67b under solenoid armature 67a is open to atmosphere exhaust by way of transverse bore 67c. Air from the central supply cavity at 48 at (for example) 75 p.s.i. flows into the space 64 and thence outwardly through work port 16. Assuming there was work to be performed by air moving out through the work port 16 and there was no solenoid switch actuation, this condition would continue.

Assume solenoid 45 is energized by momentary actuation of switch 45a, the flat chamber 70 is filled by air moving down through bore 69. When the flat chamber 70 is filled, it directs air upwardly to the left-hand solenoid chamber 65a by way of vertical bore 69a. The air supply filling bore 69, flat chamber 70, the bore 69a and the space above pistons 24 and 24a is being replenished by the bores 50 and 51 which open into the central supply chamber 48. Both poppet valve assemblies are thus depressed to the position of FIG. 3. The momentary actuation of right-hand solenoid 45 is required to make effective the subsequent actuation of the left-hand solenoid 46. This sequential use of the solenoid valves is an important feature of the invention.

The right-hand poppet assembly 23 is provided with a stem 52. The right-hand piston 24a and resilient poppet member 54 are carried on the stem 52 substantially as described in the left-hand poppet assembly. Hex nut 55 at the top and hex nut 56 at the bottom of stem 52 serve to clamp the resilient poppet members 54 and 57 against metal grommets 58 and 59. The right-hand poppet assembly is guided for vertical movement in tubular guide member 60 and the guide member 60 is held in position by the lowermost boss thereon which is received in an opening in the lower cover plate 43. A spring 61 normally biases the right-hand poppet assembly to its uppermost position as shown in FIG. 1 so that the upper poppet 54 is spaced from the seat 62 and the lowermost poppet 57 is pressed against the lower seat 63. A portion of the cavity 48 extends upwardly so as to open into the space 64 beneath the piston 24a.

Assuming the poppet assemblies are in the position illustrated in FIG. 1, air enters the valve by way of supply line 47. For purposes of illustration such air supply may come from the factory air line and, by way of a regulator set at 75 p.s.i., conducts air at such pressure to the cavity 48. Air at 75 p.s.i. moves into the space 64, thence through the open poppet 54—62 into cavity 49 and thence outwardly of the valve by way of work port 16 and line 20 to the work cylinder 17. Assuming the piston 18 of the work cylinder is near the right-hand end of the work cylinder when the air supply is admitted to the valve, the piston 18 will move to the left. The air at the left-hand side of the piston is pushed out of the work cylinder 17 and, by way of line 21 and work port 15, comes into the cavity 15a and thence upwardly into the valve body and into the space between the poppets 35 and 37. Since the upper left-hand poppet 35 is spaced from its seat at 36, such as exhaust air may move into the cavity 52 and thence outwardly by way of exhaust line 53. Where it is desired to have the work cylinder piston reciprocate, the piston rod 19 would be connected so as to bump the line switch 45a and energize the coil in solenoid 45.

The air supply is led by bores 50 and 51 into the armature chamber 65. A spring 66 in the armature chamber normally biases armature 67 downwardly so that the resilient plug 68 seals the bore 69 leading downwardly into the flat chamber 70. The space between the armature 67 and the coil for the armature 45 is provided with longitudinal grooves 71 and 72 formed in the peripheral wall of the armature 67. Such grooves open into a shallow chamber 73 above the armature 67. The travel of the armature when the coil is energized is indicated at 74. When the switch 45a for the right-hand solenoid 45 is bumped, the armature 67 is moved upwardly against the bias of the spring 66. The air at 75 p.s.i. in the solenoid chamber 65 then moves down into the flat chamber 70 and thence into the cylinder space above piston 24 at the left-hand side and the piston 24a at the right-hand side. This moves both of the poppet assemblies downwardly into the position shown in FIG. 3.

The air at the top of the piston 24 is effective over an area determined by the diameter Y (see FIG. 3). The stem for the left-hand valve assembly has a longitudinal bore 75 open at the top of the piston 24 as at 76. The bore extends downwardly from the opening at 76 to a transverse bore 77 located between the two poppet valves 35 and 37. The transverse bore 77 is smaller in diameter than the vertical bore 75.

The air at the underside of the piston 24 is effective over an area determined by the diameter X (see FIG. 3). Accordingly the effective area at the underside of the piston 24 and the piston may thus be biased by the differential areas to maintain the piston 24 in its lowered position as shown in FIG. 3.

When the switch 45a for the right-hand solenoid 45 energizes the coil, the armature 67 is raised from the port 69 and air at substantially 75 p.s.i. moves through bore 69 into the flat chamber 70 and thence into the cylinders depressing both poppet assemblies. The smaller diameter of the bore 77 in poppet stem 26 compared to the vertical bore 75 in the stem 26 accelerates the closing of the poppet valve 35 against the seat 36. The air in supply source chamber 48 then moves through the lower left-hand poppet valve opening as indicated by the arrow 79. Such air from the source chamber 48 then moves out of the valve body 7 through work port 15. Such air as exits at work port 15 then moves by way of pipeline 21 to the left-hand end of the work cylinder 17. The air admitted at the left-hand end of the work cylinder moves the piston 18 to the right and the air at the right-hand end of the work cylinder is moved out of the cylinder as exhaust by way of pipeline 20 to work port 16. Exhaust air coming into the valve body by way of work port 16 then moves in the direction of arrows 80 to the chamber 51a and thence to the exhaust 51.

It will be understood that following the momentary depression of switch 45a, the armature 67 returns to its starting position as shown in FIG. 1. The poppet valves remain in their position as shown in FIG. 3 and there is no current flow through either solenoid coil. The left-hand poppet assembly in its stationary position of FIG. 3 permits air to move into port 76 and through the vertical bore 75 so as to balance the pressure on opposite sides of the piston 24. Such replenishing air also restores the solenoid chambers to 75 p.s.i. The poppet valves are maintained in such position regardless of the attitude or mounting angle of the valve. When, however, the left-hand solenoid 46 is energized by momentary depression of the switch 46a, the pressure drop above the pistons 24 and 24a and in the vertical bore 75 is effective to restore both of the poppet valve assemblies to the position shown in FIG. 1.

The current flow in solenoid 46 is momentary and the poppet valve assemblies remain in the position of FIG. 1 until the right-hand solenoid switch 45a is again energized as described above.

Although the preferred embodiment of the invention has been described here in connection with controlling the flow of air, it will be understood that liquid fluid pressure, such as hydraulic fluid, may be connected to the inlet supply at 47 and that the same mode of operation as above described will result. It will also be understood that numerous colorable variations may be made without departing from the scope of the invention.

What I claim is:

1. A poppet valve for momentary contact solenoid operation comprising a valve body, a first poppet assembly mounted in said body for reciprocation to first and second positions, a second poppet assembly mounted in said body for reciprocation to first and second positions, inlet means for fluid pressure, outlet means for fluid pressure, one of said poppet assemblies in said first position establishing a fluid flow path from said inlet means to outlet means, the other of said poppet assemblies in the first position establishing a fluid flow path from the outlet means, a first solenoid valve connected to said fluid pressure inlet source adapted to be momentarily energized to effect movement of said first and second poppet assemblies from said first position to said second position, said other of said poppet assemblies in said second position establishing a fluid pressure flow path from said inlet means to said outlet means, said one poppet assembly in said second position establishing a fluid pressure flow path from said outlet means, means for directing fluid pressure from said inlet source to a second solenoid valve so as to make ready for operation said second solenoid valve, and means to momentarily energize said second solenoid valve to restore said poppet assemblies to said first position.

2. A valve according to claim 1 wherein two outlets are provided and in said first position one of said poppet assemblies directs fluid pressure flow to one outlet and in said second position the other of said poppet assemblies directs fluid pressure flow to the other outlet.

3. A valve according to claim 1 wherein each poppet assembly includes a stem having two spaced poppet heads fixed thereto and the valve body provides two spaced seats for the poppet heads, the distance between the spaced poppet heads exceeding the distance between the spaced seats whereby full opening of one fully closes the other.

4. A valve according to claim 3 wherein each stem has a piston fixed thereto adjacent the poppet head and the area of the piston exceeds the area of the adjacent poppet head.

5. A valve according to claim 4 wherein one stem has an axial bore therethrough opening into the space above the piston and into the space between the two poppet heads.

6. A poppet valve and momentary pilot valve, comprising: a valve body, an inlet in said valve body, an outlet in said valve body, an exhaust in said valve body, a valve bore, a poppet assembly in said valve bore having spaced poppet heads and a pilot piston at one end thereof, said outlet communicating with said bore between said poppet heads, said exhaust communicating with said bore at the distal side of one of said heads, said inlet communicating with said bore on the distal side of the other of said heads, pilot valve means for momentarily supplying fluid to said pilot piston to shift the valve assembly, passage means in said valve assembly communicating the bore portion between said heads with the pilot piston to maintain the valve shifted, and valve means for exhausting said pilot piston to permit return of said valve assembly from the shifted position.

7. A poppet valve assembly comprising: a valve body, an inlet in said valve body, an outlet in said valve body, an exhaust in said valve body, a valve bore, a valve member slideable in said valve bore from a first position connecting said inlet to said outlet to a second position connecting said outlet to said exhaust, one end of said valve member defining a pilot, a chamber in said bore adjacent said pilot which when pressurized shifts said valve member from one of said positions to the other, means raising the valve member to said one position, means providing selective pressurization and depressurization of said chambers including a first momentary contact valve for connecting the pilot with said chamber, a second separately actuable momentary contact valve for connecting said chamber with low pressure, and means for holding the valve member in said one position after the first momentary contact valve is deactivated including means responsive to movement of the valve member from the other position to the one position for connecting said inlet to the chamber to maintain pressurization thereof.